J. A. MURPHEY.
STEERING WHEEL.
APPLICATION FILED JULY 15, 1919.
1,366,206.
Patented Jan. 18, 1921.
2 SHEETS—SHEET 1.
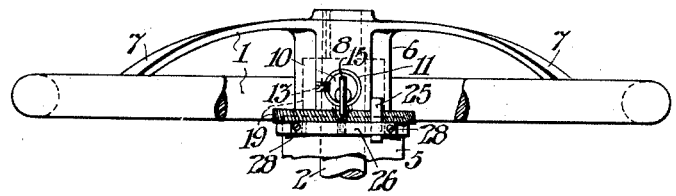
FIG. I.
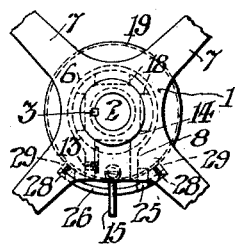
FIG. II.
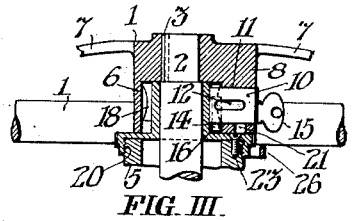
FIG. III.
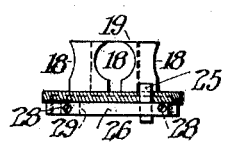
FIG. IV.
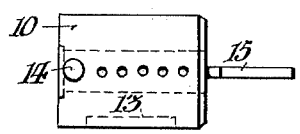
FIG. VI.
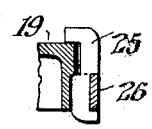
FIG. V.
INVENTOR.
James A. Murphey,
by Arthur E. Paige,
Attorney.

J. A. MURPHEY.
STEERING WHEEL.
APPLICATION FILED JULY 15, 1919.
1,366,206.
Patented Jan. 18, 1921.
2 SHEETS—SHEET 2.
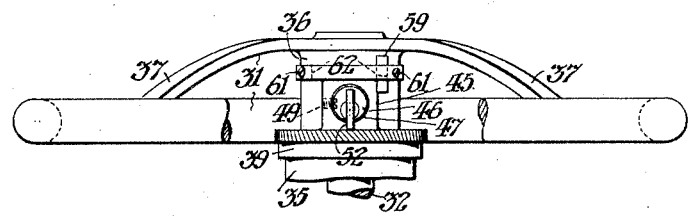
FIG. VII.
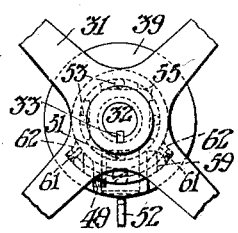
FIG. VIII.
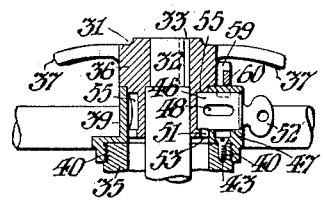
FIG. IX.
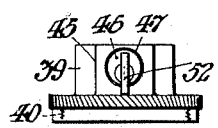
FIG. X.
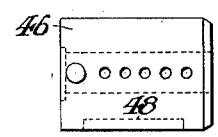
FIG. XI.
INVENTOR

UNITED STATES PATENT OFFICE.

JAMES A. MURPHEY, OF PHILADELPHIA, PENNSYLVANIA.

STEERING-WHEEL.

1,366,206.

Specification of Letters Patent.

Patented Jan. 18, 1921.

Application filed July 15, 1919. Serial No. 310,948.

*To all whom it may concern:*

Be it known that I, JAMES A. MURPHEY, a citizen of the United States, residing at Germantown, Philadelphia, in the State of Pennsylvania, have invented a certain new and useful Improvement in Steering-Wheels, whereof the following is a specification, reference being had to the accompanying drawings.

My invention relates to locking means for detachably rigidly connecting the steering shaft of a self-propelled vehicle with the bearing tube inclosing said shaft so as to prevent the vehicle from being steered when locked; and preferably so constructed and arranged that the front wheels of such a vehicle may be turned at right angles to their normal position against a curb or similar obstruction before thus locking it, to prevent the vehicle from being towed.

As hereinafter described; my invention includes a lock, preferably of a pin key type, which may be permanently retained in connection with the vehicle but alternately in two positions, in both of which it is locked, but in only one of which it locks the vehicle.

Although my present invention is of the general class claimed in my Letters Patent of the United States No. 1,156,615, dated October 12, 1915; it embodies improvements as to the specific construction and arrangement of the elements thereof, whereby the cost of manufacture is materially reduced as compared with the structures shown in said Letters Patent. Moreover, my present invention is particularly applicable to the forms of steering wheels employed on " Ford " automobiles. It is characteristic of the present " Ford " construction that the steering wheel is free to be turned more than a complete revolution, in either direction and, although it is usually unnecessary to turn it more than a complete revolution, when thus turned, the shaft of the steering wheel is thereby automatically disconnected from the front wheels of the vehicle, thus freeing the latter from control of the operator until the proper connection is manually restored. Therefore, an advantageous adjunctive feature of my present invention is the provision of a stop device, in coöperative relation with the lock casing, constructed and arranged to prevent the operator from turning the steering wheel more than a complete revolution, in either direction, but permitting it to be turned freely to the extent of a complete revolution in either direction.

My invention includes the various novel features of construction and arrangement hereinafter more definitely specified.

In the drawings: Figure I is a fragmentary elevation of a steering wheel and its appurtenances, of the present " Ford " type, but including a convenient embodiment of my invention, wherein the lock casing is carried by the steering wheel, adapted to prevent any rotary movement of said wheel, by locking it in connection with the bearing tube in which the steering wheel shaft is journaled, and also including a stop device, in coöperative relation with the lock casing, to limit the rotary movement of said wheel to a single revolution in either direction, when unlocked.

Fig. II is a fragmentary plan view of the structure shown in Fig. I.

Fig. III is a fragmentary vertical sectional view of said structure shown in Figs. I and II.

Fig. IV is an elevation of the cap of the stationary bearing tube indicated in Figs. I, II and III, and carrying the stop device aforesaid.

Fig. V is a fragmentary vertical sectional view, showing the circumferentially movable dog of the stop device indicated in Figs. I to IV inclusive, but full sized.

Fig. VI is an inverted plan view of the lock indicated in Figs. I, II and III.

Fig. VII is a fragmentary elevation of a steering wheel and its appurtenances for a " Ford " automobile, differing from Fig. I, in that the lock casing is stationary and accessory to the stationary bearing tube.

Fig. VIII is a fragmentary plan view of the structure shown in Fig. VII.

Fig. IX is a fragmentary vertical sectional view of the structure shown in Figs. VII and VIII.

Fig. X is an elevation of the stationary bearing tube cap, including the lock casing.

Fig. XI is an inverted plan view of the lock and its key indicated in Figs. VII, VIII and IX, and of the same pattern shown in Fig. VI.

Referring to the form of my invention shown in Figs. I to VI inclusive; the rotary steering wheel 1 of the automobile is normally rigidly connected with the steering shaft 2 by the key 3, and said shaft 2 is journaled in the stationary bearing tube 5, which is rigidly connected with the body of the vehicle.

As indicated in Figs. I, II and III; the hub 6 of said wheel 1 is cast in unitary relation with its spokes 7 and includes the eccentric extension 8 which forms a casing for the lock 10 which is mounted to reciprocate in the lock socket 11 in said extension; the extent of its reciprocation being limited by the slot 12 in which the screw 13 extends in rigid relation with said hub 6. Said lock 10 includes the slide bolt 14 which is operable by the key 15 and, when in locked position, engages the recess 16 in said lock casing; in which position said lock extends in one of the four openings 18 in the cap 19 of the stationary bearing tube 5; which cap is conveniently detachably connected with the upper end of said bearing tube, by the screw thread 20, indicated in Fig. III. Said cap 19 is normally held stationary on said stationary bearing tube 5, by the screw 23 which extends through said cap in engagement with said tube, as shown in Fig. III.

In order to release said steering wheel 1 from its locked stationary position shown in Figs. I to III inclusive; said key 15 may be turned, clock-wise, to retract said locking bolt 14 from said recess 16, and said lock 10 be withdrawn to the extent limited by said slot 12 and screw 13, whereupon, said locking bolt 14 registers with the recess 21, formed in its casing 8, and the lock may be secured in that position, (in which it is unlocked as far as the steering wheel is concerned,) by thrusting said slide bolt outwardly, by reverse turning movement of said key 15. Said key 15 may be withdrawn from said lock 10 whenever said locking bolt 14 is projected, but cannot be withdrawn from said lock 10 when said bolt is retracted and, consequently, serves as a handle by which said lock 10 may be reciprocated. Of course, when said screw 13 is withdrawn from said slot 12; said lock 10 may be withdrawn from its casing in said hub extension 8. However, in the ordinary use of this form of my invention, said screw 13 remains in the position shown in Fig. II and said lock 10 is continuously carried in said hub 6 of the wheel 1.

In the form of my invention above described; the stop device above contemplated, whereby the steering wheel is prevented from turning more than a complete revolution, in either direction, is conveniently mounted upon said stationary bearing tube cap 19, as shown in Figs. I to V inclusive. Said extension 8 of the hub 6 which forms the casing for said lock 10 as above described, extends eccentrically to said steering shaft 2, as best shown in Fig. II, wherein said wheel 1 has been turned anticlockwise a complete revolution, and is stopped by the circumferentially movable dog 25.

Said dog 25 overhangs said cap 19, as best shown in Fig. V and is held in operative relation with said lock casing 8 by the guide rail 26 which is conveniently secured in stationary position by the screws 28, extending in the abutments 29 on said cap 19, which limit the extent of the circumferential movement of said dog 25. It is to be understood that said wheel 1 may be turned a complete revolution clock-wise, from its position shown in Fig. II; moving freely away from said dog 25, which is on the right hand side of the lock casing 8 in Fig. II, until what is the left hand side of said lock casing in Fig. II, encounters the opposite side of said dog and thrusts it to the opposite limit of its range of movement upon said guide rail 26, whereupon, said wheel 1 is again stopped at the completion of a single revolution.

Therefore, it is to be understood that the stop device above described, permits said steering wheel 1 to be freely turned in either direction to the extent of a complete revolution, when said wheel 1 is unlocked, but prevents it from being turned to a greater extent, in either direction, and thus prevents accidental disconnection of said steering wheel from the front dirigible wheels of the vehicle.

Referring to the form of my invention shown in Figs. VII to XI inclusive; the rotary steering wheel 31 of the automobile is normally rigidly connected with the steering shaft 32 by the key 33, and said shaft 32 is journaled in the stationary bearing tube 35, which is rigidly connected with the body of the vehicle.

As indicated in Figs. VII and IX; the hub 36 of said wheel 31 is cast in unitary relation with its spokes 37, and fits within the stationary tubular cap 39 of said stationary bearing tube 35; which cap is conveniently detachably connected with the upper end of said bearing tube, by the screw thread 40 indicated in Fig. IX. Said cap 39 is normally held stationary on said stationary bearing tube 35 by the screw 43 which extends through said cap, in engagement with said tube, as shown in Fig. IX. Said cap 39 includes the eccentric extension 45 which forms a casing for the lock 46 which is mounted to reciprocate in the lock socket 47 in said extension; the extent of its reciprocation being limited by the slot 48 in which the screw 49 extends in rigid relation with said casing 39, as indicated in Figs. VII and VIII. Said lock 46 includes the slide bolt 51 which is operable by the key 52, and, when in locked position, engages the recess 53 which extends partly in said cap 39 and partly in said hub 36; in which position said lock 46 extends in one of the four openings 55 in said hub 36 and prevents rotary movement of said steering wheel 31.

In order to release said steering wheel 31 from its locked stationary position shown in Figs. VII to IX inclusive; said key 52 may be turned, clock-wise, to retract said locking bolt 51 from said recess 53, and said lock 46 be withdrawn to the extent limited by said slot 48 and screw 49, whereupon, said locking bolt 51 registers with the recess 57 in its casing in said cap 39, and said lock may be secured in that position, (in which it is unlocked, as far as the steering wheel is concerned) by thrusting said slide bolt outwardly, by reverse turning movement of said key 52.

Said key 52 may be withdrawn from said lock 46 whenever said locking bolt 51 is projected, but cannot be withdrawn from said lock when said bolt is retracted and, consequently, serves as a handle by which said lock 46 may be reciprocated. Of course, when said screw 49 is withdrawn from said slot 48; said lock 46 may be withdrawn from its casing in said stationary cap 39. However, in the ordinary use of this form of my invention, said screw 49 remains in the position shown in Figs. VII and VIII and said lock 46 is continuously carried in said stationary bearing tube cap 39.

In the form of my invention shown in Figs. VII to XI inclusive; the stop device above contemplated, whereby the steering wheel is prevented from turning more than a complete revolution, in either direction, is conveniently mounted upon said steering wheel 31. Said extension 45 of the cap 39, which forms the casing for said lock 46 as above described, extends eccentrically to said steering shaft 32, as best shown in Fig. VIII, wherein said wheel 31 has been turned anti-clockwise, a complete revolution and is stopped by the circumferentially movable dog 59 which encounters the right hand side of said lock casing extension 45 as indicated in Figs. VII and VIII. Said dog 59 is held in operative relation with said lock casing 45 by the guide rail 60 which is conveniently secured in rigid relation with the hub 36 of said wheel 31 by the screws 61 extending in the abutments 62 on said hub, which limit the extent of the circumferential movement of said dog 59.

It is to be understood that said wheel 31 may be turned a complete revolution, clockwise, from its position shown in Fig. VIII, until what is the left hand side of said lock casing 45 in Fig. VIII encounters the opposite side of said dog 59 and thrusts it to the opposite limit of its range of movement upon said guide rail 60, whereupon, said wheel 31 is again stopped at the completion of a single revolution.

Therefore, it is to be understood that the stop device last above described permits said steering wheel 31 to be freely turned in either direction to the extent of a complete revolution, when said wheel is unlocked, but prevents it from being turned to a greater extent, in either direction, and thus prevents accidental disconnection of said steering wheel 31 from the front dirigible wheels of the vehicle.

It may be observed that the employment of a lock of cylindrical form as distinguished from the unsymmetrical form employed in the structures shown in said Letters Patent 1,156,615 not only lessens the cost of the lock itself, but permits the employment of ordinary rotary boring tools to form the lock socket in the lock casing and thus materially lessens the cost of manufacture. Moreover, the provision of the lock casing in unitary relation with an essential member of the autmobile structure, materially reduces the cost of manufacture of my invention as compared with the structures shown in said Letters Patent; and such costs are further reduced by forming the lock engaging openings directly in one of the essential automobile elements instead of in a primarily separate structure as shown in said Letters Patent, and my application for Letters Patent of the United States executed upon the same date as this application, and copending therewith as Serial Number 310,947 includes claims generically covering the structures herein illustrated, although the illustrations of that application do not include the stop device which is herein claimed and which is particularly applicable to the "Ford" automobile, and it is to be noted that such a stop device may be employed without limitation to the specific lock construction described.

Therefore, I do not desire to limit myself to the precise details of construction and arrangement herein set forth, as it is obvious that various modifications may be made therein without departing from the essential features of my invention as defined in the appended claims.

I claim:

1. The combination with a rotary steering wheel of an automobile; of means arranged to limit the rotary movement of said wheel to a single revolution in either direction, including a dog movable circumferentially with respect to the axis of said wheel, a single stationary element arranged to be encountered by said dog, when said wheel is turned in either directtion, and means, carried by said wheel, limiting the range of circumferential movement of said dog, including a guide rail and abutments at respectively opposite ends thereof.

2. The combination with a rotary steering wheel of an automobile; of means arranged to limit the rotary movement of said wheel to a single revolution in either direction, including a dog movable circumferentially with respect to the axis of said wheel, a single stationary element arranged to be encountered by said dog, when said wheel is turned in either direction, and means, limiting the range of circumferential movement of said dog, including a guide rail and abutments at respectively opposite ends thereof.

3. The combination with a rotary steering wheel of an automobile; of means arranged to limit the rotary movement of said wheel to a single revolution in either direction, including a dog movable circumferentially with respect to the axis of said wheel, a single stationary element arranged to be encountered by said dog, when said wheel is turned in either direction, and means, limiting the range of circumferential movement of said dog.

4. The combination with a rotary steering wheel of an automobile; of means arranged to limit the rotary movement of said wheel, including an element distinct from the wheel, movable circumferentially with respect to the axis of said wheel; means limiting the circumferential movement of said element; and a stationary element arranged to be encountered by said movable element when said wheel is turned in either direction.

5. A stop device adapted to limit the rotary movement of an automobile steering wheel, including a relatively stationary element; means supporting said wheel for rotation adjacent said stationary element; and an element movable circumferentially with respect to the axis of said wheel, adapted to encounter said stationary element upon respectively opposite sides when said wheel is turned in respectively opposite directions; and means limiting the range of circumferential movement of said movable element.

6. The combination with an automobile shaft; of a stationary bearing for said shaft, and means arranged to limit the rotary movement of said shaft in said bearing, including an element movable circumferentially with respect to both said shaft and said bearing; means carried by said shaft limiting the range of circumferential movement of said element with respect to said shaft; and means carried by said bearing limiting the range of circumferential movement of said element with respect to said bearing.

7. An article of manufacture accessory to an automobile steering shaft; including a member adapted to encircle said shaft, carrying a stop member movable circumferentially with respect to the axis of said shaft, and means limiting the range of such circumferential movement.

8. The combination with an automobile steering shaft; of a bearing for said shaft; means arranged to permit turning movement of said shaft in said bearing but limiting the extent of such movement, including a stop element appurtenant to said shaft, and a stop element appurtenant to said bearing; and means supporting one of said stop elements for limited circumferential movement by the other.

In testimony whereof, I have hereunto signed my name at Philadelphia, Pennsylvania, this twelfth day of July, 1919.

JAMES A. MURPHEY.

Witnesses:
 ARTHUR E. PAIGE,
 FRANK E. PAIGE.